United States Patent [19]

Kawashima et al.

[11] Patent Number: 5,690,890
[45] Date of Patent: Nov. 25, 1997

[54] SOLDER

[75] Inventors: Yasuji Kawashima, Ibaraki; Takashi Nagashima, Takatsuki; Akihiko Matsuike, Takarazuka; Takeshi Meguro, Ibaraki; Kaoru Shimizu, Osaka; Hideo Chaki, Ibaraki; Toshiaki Ogura, Mino, all of Japan

[73] Assignees: Matsushita Electric Industrial Co., Ltd.; Kabushiki Kaisha Nihon Genma, both of Osaka, Japan

[21] Appl. No.: 334,236

[22] Filed: Nov. 4, 1994

[30] Foreign Application Priority Data

Nov. 9, 1993 [JP] Japan .................... 5-279381
Mar. 24, 1994 [JP] Japan .................... 6-053489

[51] Int. Cl.$^6$ ......................................... B23K 35/36
[52] U.S. Cl. ................ 420/559; 420/563; 420/566; 420/571
[58] Field of Search ....................... 420/559, 563, 420/566, 571; 148/23, 24, 25

[56] References Cited

FOREIGN PATENT DOCUMENTS

| 0 168 674 | 1/1986 | European Pat. Off. . | |
|---|---|---|---|
| 0 507 718 | 10/1992 | European Pat. Off. . | |
| 37 307 64 | 9/1987 | Germany . | |
| 56-144893 | 11/1981 | Japan . | |
| 59-153857 | 9/1984 | Japan | 420/559 |
| 61-273296 | 12/1986 | Japan | 420/571 |
| 3-106591 | 5/1991 | Japan . | |
| 3-128192 | 5/1991 | Japan | 420/571 |
| 3-204194 | 9/1991 | Japan | 420/571 |
| 4-333392 | 11/1992 | Japan . | |

OTHER PUBLICATIONS

Abstract of JP-3255637, Toshiba, "Solder for Die Bonding of Substrate and Semiconductor . . . ", Nov. 14, 1991.

Abstract of JP-57072789, Shigemi, "Solder Alloy", Jul. 5, 1982.

Abstract of JP-55018505, Narutoshi et al., "Soldering Alloy for Attaching Silver Electrode Leading Wire", Oct. 4, 1980.

*Primary Examiner*—Sikyin Ip
*Attorney, Agent, or Firm*—Wenderoth, Lind & Ponack

[57] ABSTRACT

A tin-lead alloy solder is provided which exhibits high joint strength under conditions which are likely to induce fatigue fracture. The tin-lead alloy solder comprises 15–80 wt. % lead, 0.1–5 wt. % silver, 0.1–10 wt. % antimony, and 0.0005–0.3 phosphorus, the balance being tin.

1 Claim, 1 Drawing Sheet

SOLDER

BACKGROUND OF THE INVENTION

1. Field of the Invention

The present invention relates to tin-lead alloy solders.

2. Description of the Prior Art

Tin-lead alloy solders, which are meltable at low temperatures, have long been used as handy materials for a wide range of applications. Improved tin-lead alloy solders have been proposed which are each composed mainly of tin and lead, with a third metal ingredient added for characteristic improvements. Such tin-lead alloys are described in, for example, Japanese Patent Publication Nos. 40-25885, 45-2093, 55-18505, 57-39880, 49-21028, and 49-23986; and Japanese Patent Application Laid-Open Nos. 48-97752, 51-54056, 54-72738, 56-144893, 60-166191, 61-82994, 61-269998, 61-115692, 3-32487, 3-106591, 3-204193, 3-204194, 4-333392, 54-72738, 59-70490, 57-160594, 63-313689, 53-113245, and 58-218394. Of these prior art disclosures, Japanese Patent Publication No. 57-39880 discloses a tin-lead alloy solder having phosphorus incorporated therein, but there is no other which teaches the use of phosphorus as such. Japanese Patent Publication No. 57-39880 discloses a tin-silver alloy solder containing cadmium which is suitable for use in soldering electronic parts having gold and/or silver films formed thereon. Cadmium loading may increase surface oxidation of melted solder and lower the wettability, as well as the spreadability, of the solder. It is reported that phosphorus will inhibit surface oxidation of melted solder, improve solder wettability, and prevent any such defect as may otherwise arise from oxide being caught in the solder melt when solidified, thereby to inhibit any decrease in mechanical strength.

SUMMARY OF THE INVENTION

Recently, with good advance in the practice of high density mounting, as in surface mounting, soldering has been required to meet demanding conditions such that the solder is exposed to heat and stress. In such situation, conventional solders of the tin-lead alloy type are often found to be insufficient to provide the required joint strength. Especially, for soldering with respect to automotive printed boards and heating-part packaged boards, development has been desired of a solder which can exhibit highly reliable performance under conditions which are likely to induce fatigue fracture.

The present invention provides a tin-lead alloy solder which is composed essentially of 15–80 wt. % antimony lead, 0.1–5 wt. % silver, 0.1–10 wt. %, and 0.0005–0.3 wt. % phosphorus, the balance being tin.

In the present invention, the use of phosphorus in combination with silver and antimony is particularly effective for improvement of fatigue characteristics, more particularly thermal fatigue characteristics, of soldered parts.

DETAILED DESCRIPTION OF THE INVENTION

Figure 1:
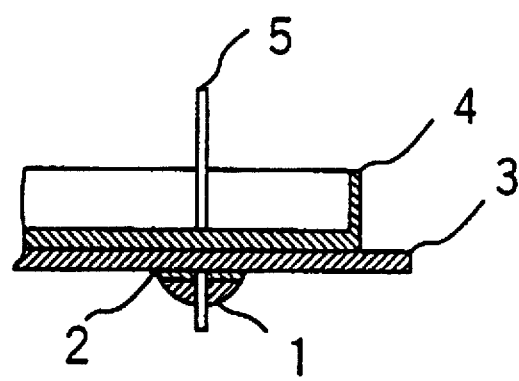
FIG. 1 is a view illustrative of the manner in which a test sample used in thermal fatigue characteristic testing is mounted in position.

In accordance with the present invention, a tin-lead alloy solder contains 15–80 wt. %, typically 30–60 wt. %, of lead on the basis of total weight of the solder. If its lead content is too large or too small, the solder is unsuitable for use in soldering electronic materials, because such a lead content is a cause of unacceptable rise in melting point. The lead content may be partially replaced with a metal selected from the group consisting of cadmium, bismuth, indium, zinc, copper, and gallium. The amount of such metal is 0.1–22 wt. %; preferably 5–22 wt. %, on the basis of the total weight of the solder in case of cadmium, bismuth and indium. Further, the amount of such metal is preferably not more than 30 wt. % of the lead. Even in that case, the lead content of the solder is not less than 15 wt. %, preferably not less than 30 wt. %, of the total weight of the solder. These metals may be used in combination of two or more kinds.

The lead may be partially replaced with more than one kind of metal selected from the group consisting of cadmium, bismuth, indium, zinc, copper, and gallium.

The amount of such replacement is generally not more than 70 wt. % of the lead content, and preferably 0.1–22 wt. % relative to the total weight of the solder.

Cadmium, bismuth, or indium is used for the purpose of lowering the melting point of the solder. It is to be noted, however, that cadmium is toxic and bismuth will embrittle the solder, and that gallium and indium are very expensive. Therefore, it is desired that use of these materials be limited to as small an amount as possible. Effective quantity ranges for use of these materials are 5–22 wt. % for cadmium, 5–22 wt. % for bismuth, and 0.1–22 wt. % for indium.

Zinc and copper are effective for improvement of material strength. Zinc may be used also for corrosion preventing purposes. Both zinc and copper, when used in a large quantity, will give rise to an in crease in the melting point of the solder. Therefore, the proportion of such metal is preferably limited to not more than 22 wt. %. Effective quantity range for use of such metal is 0.1–10 wt. %, more preferably 0.1–5 wt. %.

Gallium is used for the purpose of preventing oxidation. Since it is liable to become oxidized, however, use of gallium in a large proportion may lead to defective soldering. Therefore, preferable amount of gallium to be used is from 0.001 to 1 wt. %, more preferably from 0.001 to 0.5 wt. %.

In the present invention, silver is used in a quantity range of from 0.1 to 5 wt. % for the purpose of increasing the material strength of the solder itself. If the quantity of silver is less than 0.1 wt. %, the silver does not contribute to the purpose. If the quantity is more than 5 wt. %, there will be produced a non-melting intermetallic compound, and this unfavorably affects the flowing and soldering characteristics of the solder, the solder being thus unsuitable for use in precision soldering. Optimum quantity range for use of silver is from 0.3 to 4 wt. %, more preferably from 0.5 to 3 wt. %.

In the present invention, antimony is important for the purpose of increasing the material strength of the solder. If the proportion of antimony is less than 0.1 wt. %, any significant effect of antimony loading cannot be obtained. If the proportion is more than 10 wt. %, there will be produced a non-melting intermetallic compound which makes the solder unsuitable for precision soldering. A preferred quantity range for use of antimony is from 0.2 to 7 wt. %, more preferably from 0.3 to 3 wt. %.

A portion of the antimony may be partially replaced with more than one kind of metal selected from the group consisting of aluminum, gold, magnesium, cerium, platinum, palladium, cobalt, chromium, manganese, zirconium, germanium, nickel, and tellurium.

The amount of such replacement is generally not more than about 70 wt. % of the antimony content, and preferably 0.001–3 wt. % relative to the total weight of the solder.

It is noted, however, that the quantity of such metal loading may be not more than 30 wt. %, more preferably not more than 10 wt. %, of the antimony. The quantity of such replacement metal is preferably not more than 3 wt. % on the basis of the total weight of the solder. An effective quantity for use of such metal is not less than 0.001 wt. % relative to the total weight of the solder. Even in that case, the antimony content is preferably not less than 0.1 wt. %, more preferably not less than 0.2 wt. %, on the basis of the weight of the solder. The above enumerated metals may be used in combination of two or more kinds.

Aluminum may be used for the purpose of preventing oxidation. Since it is liable to become oxidized, however, use of aluminum in a large proportion may lead to defective soldering. Therefore, it is appropriate to use aluminum in a quantity range of from 0.001 to 1 wt. %, preferably from 0.001 to 0.5 wt. %.

Platinum, palladium, cobalt, chromium, manganese, nickel, tellurium, zirconium or germanium may be used for purposes of precipitation strengthening and particle refinement. In order to avoid formation of a non-melting intermetallic compound, such metal may be used in an effective quantity range, that is, from 0.001 to 1 wt. %, more preferably from 0.001 to 0.5 wt. %.

In the present invention, phosphorus is used for the purpose of improving thermal fatigue characteristics of tin-lead alloy solders and, more particularly, tin-lead alloy solders containing silver and antimony. The amount of phosphorus is 0.0005–0.3 wt. %, preferably 0.0005–0.1 wt. %, more preferably 0.001–0.05 %, on the basis of the total weight of the solder. If the phosphorus content is less than 0.0005 wt. %, it provides no benefit at all. If it is more than 0.1 wt. %, there will no longer be improvement in thermal fatigue characteristics. If the amount of phosphorus exceeds 0.3 wt. %, a reaction product of silver with the phosphorus will cause a decrease in solderability and other characteristic degradation.

Tin constitutes the balance of the tin-lead alloy solder components and is typically used in a quantity range of 10–85 wt. %. This quantity level corresponds to general tin content level in conventional tin-lead alloy solders. Where the tin content is less than 10 wt. % or more than 85 wt. %, there will be an increase in the melting point of the solder, so that the solder is rendered unsuitable for use in soldering electronic materials. Further, the high melting temperature is a cause of considerable oxidation. The decrease of the tin content below the lower limit leads to a corresponding increase of lead content in the solder composition, which may reduce material strength of the solder and accelerate the formation of an α layer. While an increase in the amount of lead is effective for controlling the development of a tin-copper layer at high temperatures, the mixing ratio of these ingredients should be selected according to the object for which the solder is to be used, and conditions for use of the solder. An increase in the amount of tin will result in a cost increase and reduce the effect of silver loading.

A solder having phosphorus incorporated therein exhibits improved solder cuttability and improved solderability.

The present invention also relates to a cream solder containing powder of the above described solder powder. The cream solder of the invention contains, in addition to the solder powder, flux components, such as resins, an activator, a viscosity controlling agent, and a solvent.

Preferably, the solder powder has a mean particle size of 5–100 μm, more preferably 15–50 μm. The solder powder may be of any shape such as substantially completely spherical, flat block shaped, needle-like, irregular, etc., and any such shape may be suitably selected according to the desired property of the cream solder, such as thixotropy, or sag resistance.

The solder powder content in the cream solder is 80–95 wt. %, preferably 85–92 wt. %, relative to the total weight of the cream solder.

For the resin to be compounded in the cream solder, those resins which are commonly used in the preparation of conventional tin-lead alloy cream solders may be selectively used. Typical examples of such resins are rosin, disproportionated rosin, hydrogenated rosin, maleated rosin, polymerized rosin, and refined rosin. Resins which are especially preferred for the purpose of the present invention are polymerized rosins.

The proportion of the resin is preferably 20–80 wt. %, more preferably 40–60 wt. %, relative to the total flux weight.

For the activator, any of those activators which are generally used in conventional tin-lead alloy solders may be used as desired. Specifically, organic acids, such as adipic acid, sebacic acid, and salicylic acid, may be exemplified as such. Also, amine, amino alcohols, such as triethanol amine, and the like are exemplified. Further, halogenated hydroacids of amine, such as ethylamine HBr, aniline HBr, cyclohexylamine HCl, and cyclohexylamine HBr are exemplified. Typically, these activators are preferably used in the proportion of 0–10 wt. %, more preferably 0.5–3 wt. %, relative to the total flux weight.

For the viscosity controlling agent, there may be exemplified ester materials, including hardened or semi-hardened oils of those such as coconut oil, tallow, castor oil, whale oil, and rapeseed oil, Japan tallow, beeswax, candelilla wax, and carnauba wax; free acids including, for example, succinic acid, azelaic acid, sebacic acid, dodecanedioic acid, myristic acid, palmitic acid, stearic acid, arachidic acid, behenic acid, coconut oil fatty acid, beef tallow fatty acid, rapeseed oil fatty acid, montanic acid, benzoic acid, phthalic acid, and trimellitic acid; polyalkylene glycols including, for example, polyethylene glycol wax, polyethylene wax, and waxes of higher fatty acid, polycarboxylic acid, etc.; polyolefins including, for example, copolymers of ethylene, propylene, butadiene, butene, isoprene, etc.; inorganic or organic extender pigments including, for example, bentonite, organic bentonite, micronized silica, aluminum, and stearate; and amides including, for example, stearamide, ethylene bis-stearamide, and oleamide. Especially preferred as viscosity controlling agents area hardened castor oil and amide wax.

The amount of such viscosity controlling agents is preferably 0.1–10 wt. %, more preferably 2–7 wt. %, relative to the total flux weight.

Examples of useful solvents are alkylene glycols. Especially preferred solvents are propylene glycol monophenyl ether and the like.

The proportion of the solvent is preferably 20–80 wt. %, more preferably 35–65 wt. %, relative to the total flux weight.

The cream solder of the invention may contain, in addition to the foregoing components, any of those other ingredients, such as oxidation inhibitor, which are used in conventional tin-lead alloy cream solders in any suitable amount. The flux content of the cream solder is 6–25 %, preferably 8–12 %. If the flux content is less than 6%, no paste can be formed. If it is more than 25%, the amount of solder powder is insufficient.

The solder of the invention may be a resin-cored solder. Useful ingredients for the resin core include resins and activators.

A formed solder product can be produced by flattening a linear solder by a roller or the like, then subjecting the flattened solder to shearing and press forming.

A formed solder may be also obtained by flattening a resin-cored solder by a roller, then blanking the flattened solder by a press. Formed products using a resin-cored solder are handy and convenient for use, requiring no flux supply.

Formed solders facilitate solder may be fed simply by placing the solder at a site where soldering is required.

Various modes of use are employed with respect to the solders of the present invention, including dip soldering by means of a solder bath, iron soldering with a resin-cored solder, reflow soldering using a cream solder, and in-situ soldering using a formed solder.

Soldering operation may be performed in various different ways depending upon fabrication methods used with respect to products which require soldering. Therefore, solders of the present invention may be used in various ways without limitation. Further, with respect to each solder product, a soldering method is available which is suitable for intended use of the solder.

The present invention also concerns a bonding method using a solder of such composition.

Soldering operations to be carried out using solders of the present invention typically relate to bonding a conductor pattern for a printed wiring board to electronic parts, terminals, a heat sink, a transformer, etc.

Solders of the invention exhibit excellent performance at soldered base portions of heating parts, large-size parts, heavy parts, etc. which are subjected to stress and heat and most susceptible to fatigue.

Use of a solder of the present invention provides for prolongation of the service life of a product, because the solder exhibits higher fatigue resistance as compared with conventional SnPb solders.

Following examples are given to further illustrate the invention.

EXAMPLES AND COMPARATIVE EXAMPLES

Production of Tin-Lead Alloy Solder

Prescribed quantities of components as shown in Tables 1 through 4 were placed in a porcelain crucible and were heated and melted at 400° C. for 10 minutes while being mixed together in a nitrogen atmosphere. As a result, a tin-lead alloy solder was obtained.

Thermal Fatigue Characteristic Test

Ten connectors of 10 pins each were soldered to a paper phenol substrate (copper foiled on one side) of 100×100×1.8 mm³ at 240° C. using the tin-lead alloy solder shown in Table 1. The manner of sample mounting in this case is shown in FIG. 1. In FIG. 1, (1) designates a solder, (2) designates a land (copper made), (3) designates a phenolic resin, (4) designates a resin connector, and (5) designates a lead (pin). The test sample was placed in a hot-air constant temperature bath at 80° C. and retained there for 30 minutes, and then held at room temperature for 5 minutes. Then, the sample was placed in a constant temperature bath held at −40° C. and was kept therein for 30 minutes. This procedure was repeated 200 cycles, and the number of pins with which cracks occurred was counted.

Crack percentage=number of phosphorus-loaded samples with which crack occurred/number of non-phosphorus loaded samples with which crack occurred.

TABLE 1

|  | Sn | Pb | Ag | Sb | Thermal fatigue characteristic test (crack percentage) Phosphorus content (ppm) | | | |
|---|---|---|---|---|---|---|---|---|
|  |  |  |  |  | 50 | 250 | 1000 | 0 |
| Com. Ex. 1 | 62 | 38 |  |  | 0.94 | 0.87 | 0.80 | 1.0 |
| Com. Ex. 2 | 62 | balance | 0.3 |  | 0.86 | 0.79 | 0.71 | 1.0 |
| Com. Ex. 3 | 62 | balance |  | 0.3 | 0.80 | 0.73 | 0.59 | 1.0 |
| Ex. 1 | 62 | balance | 0.3 | 0.3 | 0.75 | 0.62 | 0.42 | 1.0 |
| Ex. 2 | 62 | balance | 0.3 | 0.7 | 0.68 | 0.55 | 0.26 | 1.0 |
| Ex. 3 | 62 | balance | 0.3 | 1.5 | 0.60 | 0.0 | 0.0 | 1.0 |
| Ex. 4 | 62 | balance | 0.8 | 0.3 | 0.73 | 0.63 | 0.43 | 1.0 |
| Ex. 5 | 62 | balance | 2.0 | 0.3 | 0.71 | 0.58 | 0.37 | 1.0 |
| Com. Ex. 4 | 62 | balance | 0.7 |  | 0.85 | 0.76 | 0.69 | 1.0 |
| Com. Ex. 5 | 62 | balance |  | 0.7 | 0.78 | 0.69 | 0.53 | 1.0 |
| Ex. 6 | 62 | balance | 0.7 | 0.7 | 0.63 | 0.46 | 0.17 | 1.0 |
| Com. Ex. 6 | 70 | balance | 0.7 |  | 0.86 | 0.71 | 0.71 | 1.0 |
| Com. Ex.7 | 70 | balance |  | 0.7 | 0.80 | 0.70 | 0.57 | 1.0 |
| Ex. 7 | 70 | balance | 0.7 | 0.7 | 0.75 | 0.65 | 0.46 | 1.0 |
| Com. Ex. 8 | 40 | balance | 0.7 |  | 0.91 | 0.80 | 0.66 | 1.0 |
| Com. Ex. 8 | 40 | balance |  | 0.7 | 0.83 | 0.74 | 0.64 | 1.0 |
| Ex. 8 | 40 | balance | 0.7 | 0.7 | 0.81 | 0.58 | 0.48 | 1.0 |

TABLE 2

|  | Sn | Pb | Ag | Sb | 5th component | Phosphorus content (ppm) | Thermal fatigue characteristic test (crack percentge) |
|---|---|---|---|---|---|---|---|
| Com. Ex. 9 | 50 | balance |  |  | Cd 2 | 100 | 0.92 |
| Com. Ex. 9-1 | 50 | balance |  |  | 2 | nil | 1 |
| Com. Ex. 9-2 | 50 | balance |  | 0.7 | Cd 2 | 100 | 0.76 |
| Com. Ex. 9-3 | 50 | balance |  | 0.7 | 2 | nil | 1 |
| Com. Ex. 9-4 | 50 | balance | 0.7 |  | Cd 2 | 100 | 0.83 |
| Com. Ex. 9-5 | 50 | balance | 0.7 |  | 2 | nil | 1 |
| Ex. 9 | 50 | balance | 0.7 | 0.7 | Cd 2 | 100 | 0.67 |
| Com. Ex. 9-6 | 50 | balance | 0.7 | 0.7 | 2 | nil | 1 |
| Ex. 10 | 58 | balance | 0.7 | 0.7 | In 5 | 100 | 0.78 |
| Com. Ex. 10 | 58 | balance | 0.7 | 0.7 | 5 | nil | 1 |
| Ex. 11 | 46 | balance | 2.0 | 0.3 | Bi 8 | 100 | 0.83 |
| Com. Ex. 11 | 46 | balance | 2.0 | 0.3 | 8 | nil | 1 |
| Ex. 12 | 60 | balance | 2 | 1 |  | 100 | 0.78 |
| Com. Ex. 12 | 60 | balance | 2 | 1 |  | nil | 1 |
| Ex. 13 | 58.3 | balance | 1.5 | 1.0 | Cu 1.0 | 100 | 0.83 |
| Com. Ex. 13 | 58.3 | balance | 1.5 | 1.0 | 1.0 | nil | 1 |

TABLE 3

| | Sn | Pb | Ag | Sb | 5th component | 6th component | Phosphorus ppm | Thermal fatigue characteristic test (crack percentage) |
|---|---|---|---|---|---|---|---|---|
| Ex. 14 | balance | 34 | 0.5 | 0.8 | In 1.5 | Cu 0.5 | 100 | 0.68 |
| Com. Ex. 14 | balance | 34 | 0.5 | 0.8 | 1.5 | 0.5 | nil | 1 |
| Ex. 15 | balance | 30 | 1 | 0.5 | In 1 | | 100 | 0.82 |
| Com. Ex. 15 | balance | 30 | 1 | 0.5 | 1 | | nil | 1 |
| Ex. 16 | balance | 34.5 | 1 | 0.7 | In 0.8 | | 100 | 0.79 |
| Com. Ex. 16 | balance | 34.5 | 1 | 0.7 | 0.8 | | nil | 1 |
| Ex. 17 | balance | 35 | 3 | 0.8 | In 1 | | 100 | 0.80 |
| Com. Ex. 17 | balance | 35 | 3 | 0.8 | 1 | | nil | 1 |

TABLE 4

| | Sn | Pb | Ag | Sb | P % | Crack percentage | Spreadability* |
|---|---|---|---|---|---|---|---|
| Comparative Example 18 | 62 | balance | 0.7 | 0.7 | 0 | 1 | 95% |
| Example 18 | 62 | balance | 0.7 | 0.7 | 0.005 | 0.98 | 95% |
| Example 18-1 | 62 | balance | 0.7 | 0.7 | 0.01 | 0.52 | 95% |
| Example 18-2 | 62 | balance | 0.7 | 0.7 | 0.3 | 0.48 | 60% |

Examples 19–21

Fluxes for cream solders were prepared according to the respective recipes shown in Table 5.

Separately, a solder powder (62 wt. % Sn, 0.3 wt. % Ag, 0.7 wt. % Sb, balance Pb, and 50 ppm of P; mean particle size 325–660 mesh pass, made by rotary disk process) was prepared. Fluxes of Examples 19 and 20, each of 10 wt. parts, were mixed with 90 wt. parts of the solder powder and, as a result, two kinds of cream solders were obtained.

TABLE 5

| Component | Example 19 | Example 20 | Example 21 |
|---|---|---|---|
| Polymerized resin | 50 | 48 | balance |
| Diethylene glycol monobutylether | balance | balance | |
| Hydrogenated castor oil | 4 | 4 | |
| Polybutadiene carboxylic acid | 8 | 18 | 6 |
| oleyl sebacic bisamide | 5 | 3 | |
| Diethylamine HBr | 1 | 1 | 1 |

Also, the flux of Example 21 was cold-extruded, whereby a resin-cored solder having a flux content of 2 wt. % was obtained.

The tin-lead alloy solders of the present invention have an excellent resistance to thermal fatigue.

What is claimed is:

1. A tin-lead alloy solder having improved thermal fatigue characteristics which consists of 15–80 wt. % lead, 0.1–5 wt. % silver, 0.1–10 wt. % antimony, 0.0005–0.3 wt. % phosphorus, and the balance being essentially tin, wherein a portion up to 70% of lead is replaced with at least one metal selected from the group consisting of cadmium, zinc and gallium, wherein cadmium is present in an amount of 5–22 wt. %, zinc is present in an amount up to 22 wt. %, and gallium is present in an amount of 0.001 to 1 wt. %, all weight percentages of the replacement metal being based upon the total weight of the solder, and wherein a portion of the antimony, up to 70% thereof, is replaced with at least one metal selected from the group consisting of aluminum, gold, magnesium, cerium, platinum, palladium, cobalt, germanium, chromium, manganese, zirconium, nickel and tellurium, each present in an amount of from 0.001 to 1 wt. %, which proportions of said metal are based upon the total weight of the solder.

* * * * *